United States Patent [19]

Doty

[11] Patent Number: 4,823,239

[45] Date of Patent: Apr. 18, 1989

[54] SEAT RETRACTOR WITH LIGHTING MEANS

[75] Inventor: Gerald A. Doty, Crown Point, Ind.

[73] Assignee: Gateway Industries, Inc., Hazel Crest, Ill.

[21] Appl. No.: 512,009

[22] Filed: Jul. 7, 1983

[51] Int. Cl.$^4$ .............................................. B60Q 3/02
[52] U.S. Cl. ........................................ 362/75; 362/61; 362/234; 362/253
[58] Field of Search ....................... 362/61, 64, 74, 75, 362/80, 81, 103, 108, 234, 249, 251, 253, 311; 280/801-808; 242/107.2, 107.4 R, 107.4 A; 297/475-482; 307/105 B, 10 LS; 296/155, 77

[56] References Cited

U.S. PATENT DOCUMENTS

| | | | |
|---|---|---|---|
| 1,248,930 | 12/1917 | Schulz | 362/81 |
| 1,295,603 | 2/1919 | Risedorf | 362/61 X |
| 1,416,467 | 5/1922 | Hobbs | 362/75 X |
| 1,761,345 | 6/1930 | Isackson | 362/80 |
| 2,159,532 | 5/1939 | Prance | 362/80 |
| 4,067,612 | 1/1978 | Weman | 242/107.4 R X |
| 4,118,764 | 10/1978 | Bleiweiss et al. | 362/61 X |
| 4,130,253 | 12/1978 | Yasumatsu | 242/107.4 R X |
| 4,241,886 | 12/1980 | Maekawa et al. | 242/107.4 A X |
| 4,291,898 | 9/1981 | Finn et al. | 280/807 X |
| 4,312,521 | 1/1982 | Thomas et al. | 280/807 X |
| 4,344,589 | 8/1982 | Rumpf | 242/107.4 A |
| 4,365,285 | 12/1982 | Brundidge | 362/108 X |
| 4,399,955 | 8/1983 | Miskowicz et al. | 242/107.4 A |
| 4,427,164 | 1/1984 | Rumpf | 242/107.4 A |

FOREIGN PATENT DOCUMENTS

| | | | |
|---|---|---|---|
| 858929 | 12/1952 | Fed. Rep. of Germany | 296/155 |
| 1814345 | of 1969 | Fed. Rep. of Germany | 362/61 |
| 1518902 | of 1968 | France | 362/80 |

Primary Examiner—Stephen C. Bentley
Attorney, Agent, or Firm—Fitch, Even, Tabin & Flannery

[57] ABSTRACT

A seat belt retractor assembly includes lighting means for illuminating areas of a vehicle floor adjacent the retractor assembly. The preferred retractor assembly includes a plastic housing which has an opening with a lamp mounted on it to shine light through the opening. Herein, a pair of forward and rearward lamps are mounted on the same housing that covers an internal retractor assembly having a pair of seat belt retractors for a lap belt and a shoulder belt portions of an elongated seat belt. The lights are electrically connected to switches having sensing means for determining whether the vehicle doors are open or closed so that the lights may be selectively activated depending on whether the doors are opened or closed.

5 Claims, 2 Drawing Sheets

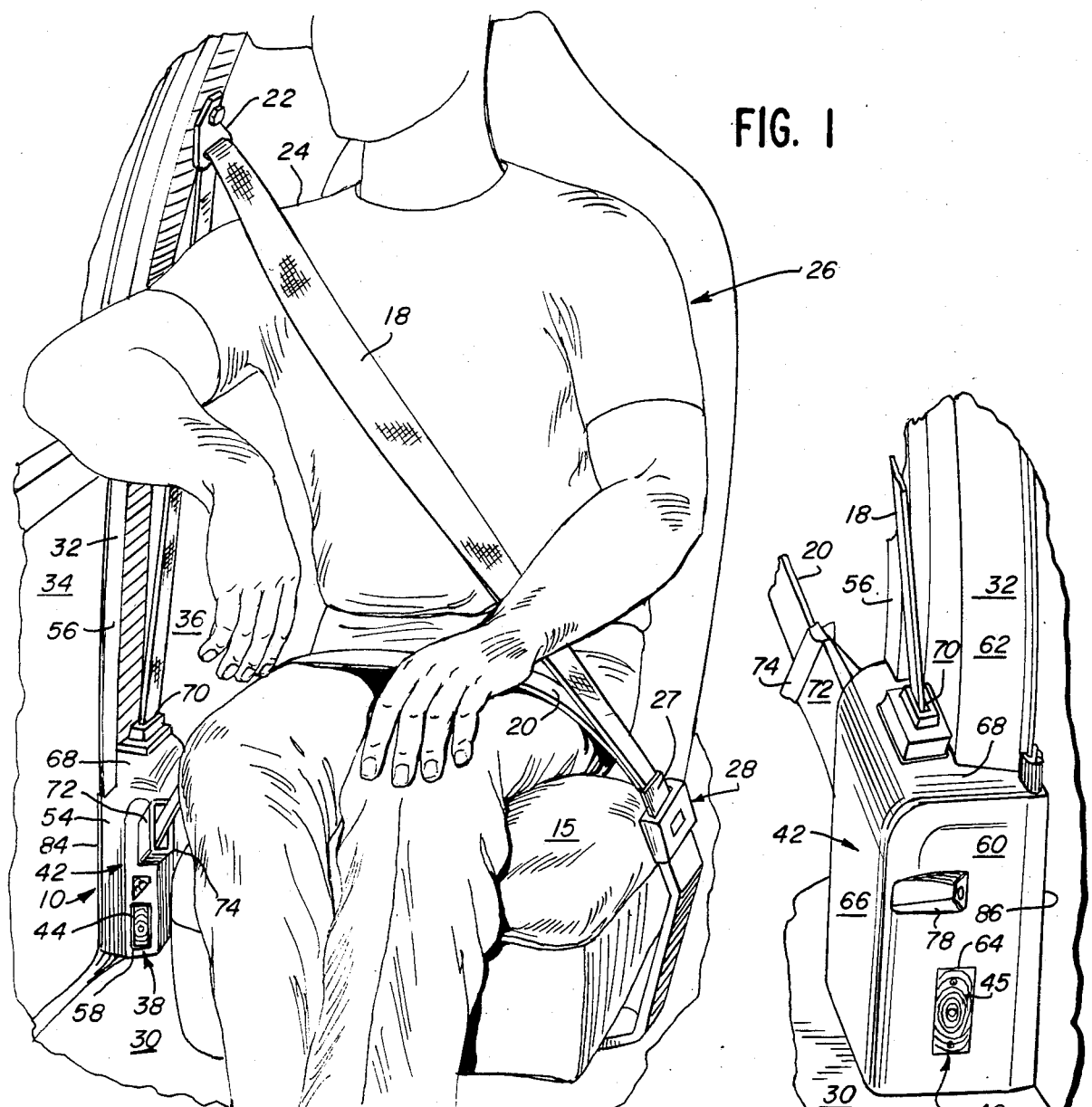
FIG. 1
FIG. 2
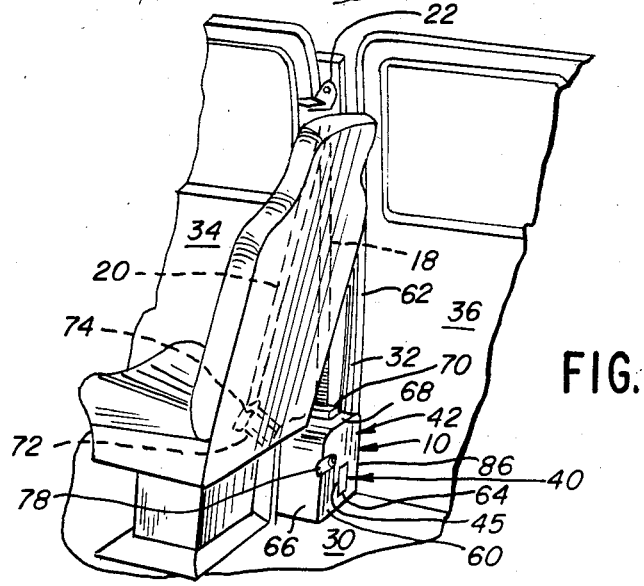
FIG. 3

SEAT RETRACTOR WITH LIGHTING MEANS

BACKGROUND OF THE INVENTION

The present invention relates generally to seat belt retractor mechanisms for safety belts and components thereof.

Most commercially sold motor vehicles are equipped with a safety belt system to restrain passengers during collisions. The safety belt system typically includes one or more separate belts or an elongated single safety belt divided into a lap belt and a shoulder belt for the passenger. One or more safety belt retractors are mounted in the vehicle for winding the lap belts and shoulder belts on reels to keep them neatly stored when not in use. It is desirable that a safety belt retractor be relatively compact to avoid interference with utilization of vehicle interior space. A known retractor mechanism is illustrated in pending U.S. patent application Ser. No. 122,289, filed Feb. 19, 1980, entitled "Dual Reel Retractor", now U.S. Pat. No. 4,399,955, which is incorporated herein by reference. Although the present invention is described herein in connection with a plurality of retractors, namely one retractor for the lap belt and another for the shoulder belt, the present invention is usable with a single retractory in a safety belt system.

To aid passengers in entering vehicles at night, it is common for vehicles such as cars and vans to have lights positioned near their doorways to illuminate portions of their floors adjacent the doors when the doors are opened. Such lights may be mounted in the walls of the vehicle or in door panels. Mounting lights in such locations may require that openings be cut in the walls or door panels and that light fixtures be fastened to the walls or panels adjacent the openings. In a vehicle having forward and rearward doors, separate lights may be required to provide adequate lighting for each door. Expenses associated with installation of lights as described above add to the cost of manufacturing the vehicle.

In the case of vans, the sliding door and captain's chairs take considerable space and does not leave large amounts of convenient space in which to mount individual laps at a relatively low cost.

SUMMARY OF THE INVENTION

In accordance with the present invention, a relatively compact seat belt retractor assembly is provided which includes lighting means for illuminating the vehicle floor area adjacent retractor assembly. The retractor assembly includes a housing which may have one or more lamps mounted thereon and preferably has lamps on its forward and rearward walls, or which may alternatively have openings formed through it to enable lamps mounted within the housing to emit light to the floor areas adjacent the housing. The preferred retractor assembly is mounted at a door pillar between a van front door and a sliding side door and provides good illumination by directing the lights toward steps adjacent the respective doors or toward other desired floor areas from selected points of the retractor housing. The present invention thus enables lighting means to be mounted conveniently and effectively for lighting the desired areas while presenting an esthetically pleasing appearance and without requiring door panels or other wall panels of the vehicle to be used for mounting.

Accordingly, it is a general object of the present invention to provide a seat belt retractor assembly and-/or components thereof which include lighting means for illuminating areas adjacent the retractor assembly.

It is an additional object of the present invention to provide a relatively compact, esthetically pleasing housing and lighting means for use with a seat belt retractor assembly.

Further objects of the present invention are set forth in the following description of the preferred embodiments of the invention.

BRIEF DESCRIPTION OF THE DRAWINGS

FIG. 1 is a perspective view of a seat belt retractor assembly in accordance with the present invention, shown installed in a van or the like and illustrating the positioning of the lap belt and shoulder belt about a passenger.

FIG. 2 is an enlarged perspective view of the assembly of FIG. 1 taken from the rear.

FIG. 3 is another perspective view of the assembly of FIG. 1, taken generally from the rear and illustrating the shoulder belt and lap belt in retracted positions.

DESCRIPTION OF THE PREFERRED EMBODIMENTS

Figure 6:
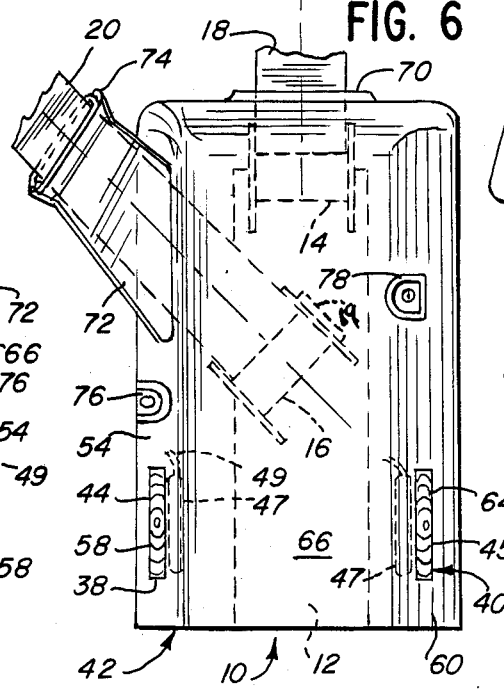
FIG. 6 is an enlarged side elevational view of the assembly of FIG. 1.

The present invention is generally embodied in a seat belt retractor assembly 10. In the illustrated embodiment, the retractor assembly includes a frame 12 (FIG. 6) which rotatably supports at least one and, in this instance, a pair of retractor reels 14 and 16 (FIG. 6) operative to retract a safety belt herein having a first portion or shoulder belt 18 and a second portion or lap belt 20 respectively. The first reel 14 has one end of the shoulder belt 18 attached to it, and the second reel 16 has one end of the lap belt 20 attached to it. Known means 19, such as described in above-referenced Application Ser. No. 122,289, are employed to selectively bias the reels 14 and 16 to apply torsion thereto for retracting the belts, and to selectively lock the reels against rotation.

As best seen in FIG. 1, the shoulder belt 18 extends upwardly from the retractor assembly 10, through a guide 22, and down across the shoulder 24 of the passenger 26 to a tongue plate 27 which may be locked within a buckle 28. Herein, the safety belt is one continuous belt with the tongue plate movable along the belt to adjust the size of the lap belt to the wearer's dimensions. The lap belt 20 extends outwardly from the retractor assembly across the lap of the passenger to the tongue plate 27.

In the illustrated embodiment, the retractor assembly 10 is shown installed in a van or the like. The retractor assembly 10 is positioned on the floor 30 of the van adjacent a support pillar 32 between a forward door 34 and a rearward door 36 on the passenger side of the van.

In the past, lights have been used to illuminate areas adjacent the doorways of vehicles to facilitate entry and exit by passengers at night. Such lights have been mounted in walls or in door panels. Mounting lights in these locations may require openings to be cut in wall panels or other panels so that light fixtures may be fastened to such panels adjacent the openings. Expenses associated with installation of lights in this manner add to the cost of manufacturing the vehicle. In addition, placement of the lights on the walls or doors in locations for optimal illumination may interfere with the placement of other components and may not be esthetically pleasing.

In vans of the type illustrated, the rearward door slides rearwardly to open. Placement of a light to illuminate the area where a passenger steps when entering the van through this door may be difficult due to the fact that effective illumination may not be obtained by mounting lights in the door since the door is moved out of position when it is opened, and due to the fact that the lights should be in a location where they are not likely to be struck by a passenger's foot or by cargo.

In accordance with the present invention, lighting means are positioned in or on the retractor assembly 10 to light areas adjacent the retractor assembly. The preferred lighting means include a forward lamp 38 which illuminates the area adjacent the forward door 34 and a rearward lamp 40 which illuminates the area adjacent the rearward door 36. The retractor assembly 10 includes a housing 42 which interfits with the support pillar 32 to provide an enclosed interior space for the retractor reels 14, 16 and associated mechanisms. The housing 42 is preferably a molded plastic housing so that it may be formed relatively inexpensively and so that openings for the lamps 38 and 40 may be formed relatively simply and inexpensively. The retractor housing 42 preferably has the lamps mounted directly thereon in an inexpensive manner and effective illumination is obtained due to the position of lights 38 and 40 adjacent the doors and in that the lights are located in proximity to one another which may facilitate installation and wiring as explained in further detail below. Herein, the lights are located at the pillar and adjacent the seat 15 and above floor level to reduce their vulnerability to damage due to accidental contact with a passenger's foot. The fit between the housing 42 and the pillar 32 and the positioning of the lamps 38 and 40 on the housing 42 provide a small and effective packaging of lights and retractors and allow positioning of the lights at locations where they can be readily serviced if a lamp burns out.

Figure 5:
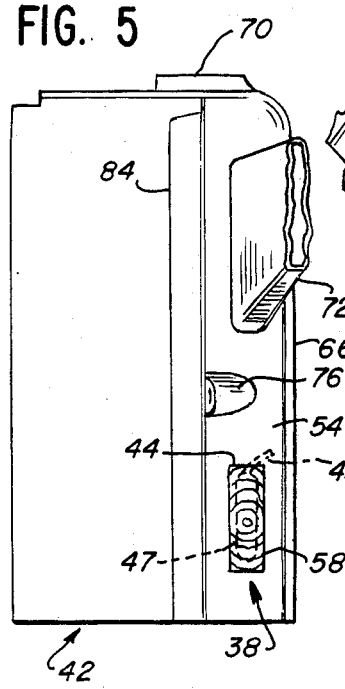
FIG. 5 is an enlarged front elevational view of the housing for the assembly of FIG. 1.
Figure 7:
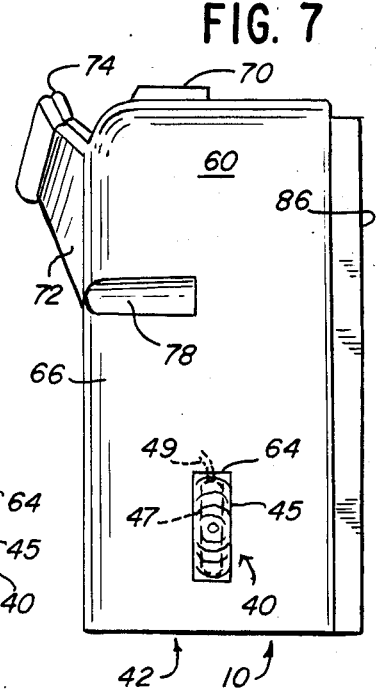
FIG. 7 is an enlarged rear elevational view of the assembly of FIG. 1.
Figure 8:
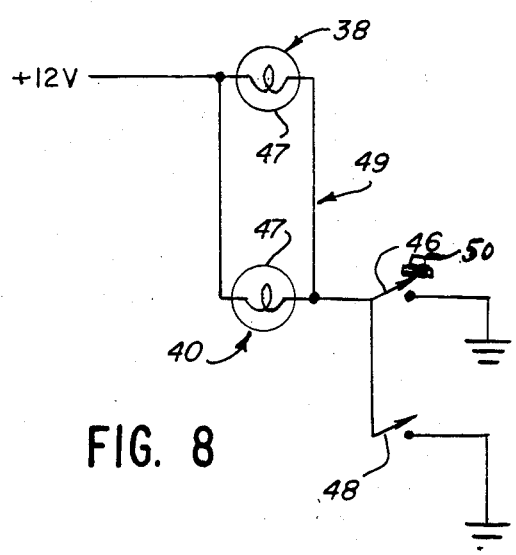
FIG. 8 is a schematic drawing of an electrical circuit for activating the lighting means of the assembly of FIG. 1 in accordance with a first embodiment of the invention.
Figure 9:
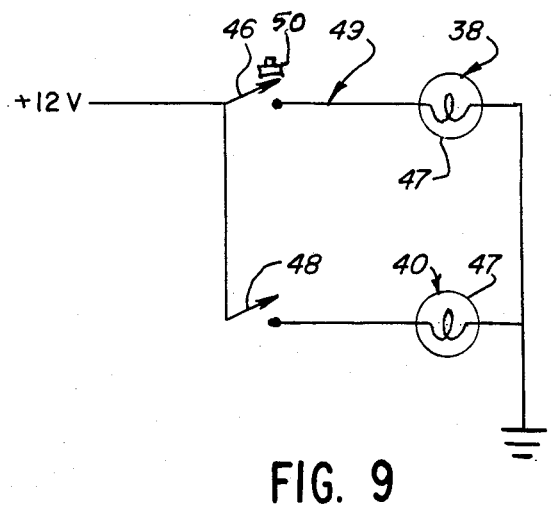
FIG. 9 is a schematic drawing of an electrical circuit for activating the lighting means of the assembly of FIG. 1 in accordance with a second embodiment of the present invention.

Turning now to a more detailed description of the illustrated embodiment, each of the lamps 38 and 40 in the preferred embodiment includes a plastic lens 44, 45 and a light bulb 47 (FIGS. 5, 6 and 7) positioned behind the lens, and electrical leads 49 for electrically connecting the light bulb to an electrical circuit. By way of example only, the electrical leads 49 may be connected into a circuit such as shown in FIGS. 8 and 9. The lamps 38, 40 are preferably electrically interconnected by leads 49 with switches 46, 48 and a power source in accordance with one of the embodiments illustrated in FIGS. 8 and 9. The switches 46 and 48 are preferably of the type which include sensing means such as a push button 50 which is pushed to open or close its associated switch when a door is opened or closed. In the embodiment illustrated in FIG. 8, both the forward and rearward lamps 38 and 40 are on when either of the doors is opened. In the embodiment illustrated in FIG. 9, the forward lamp 38 is on if and only if the forward door 34 is opened, and the rearward lamp 40 is on if and only if the rearward door 36 is open.

In the illustrated embodiment, each lamp 38, 40 is mounted on the housing 42 and supported thereby. As an alternative the lamps may be supported within the housing 42 by the frame 12 or support pillar 32 so as to emit light through openings in the housing. The housing 42 includes a front wall 54 positioned adjacent a front portion 56 (FIG. 4) of the support pillar (FIG. 6) with a generally rectangular opening 58 for the forward lamp 38. Opposite the front wall 54 is a rear, vertical wall 60 which is configured to partially wrap around a rear portion 62 of the support pillar 32, and which has a generally rectangular opening 64 formed in it for the rearward lamp 40. A generally planar vertical side wall 66 extends between the front wall 54 and the rear wall 60. A generally horizontal top wall 68 joins upper portions of the front, rear and side walls and encloses the top of the housing 42. The shoulder belt 18 extends through an opening 70 in the top wall 68. Recessed screw pockets 76 and 78 are provided in each of the front and rear walls to receive heads of fasteners to be used to secure the housing to the retractor frame or the pillar.

The preferred plastic lens 44 and 45 are sized to be snap fitted into the openings 58 and 64 so that no screws or fasteners are needed to connect or disconnect the lens from the housing. The preferred bulbs are also mounted on the rear side of the respective lenses in a conventional manner so that removal of the lens also results in removal of the bulb and its socket so that the bulb may be easily replaced and the lens pushed back into the opening. The lens and lamp units are conventionally used and commercially available and have been used in vehicles and hence need not be described in greater detail herein.

It will be appreciated that the guide 22 maintains alignment of the shoulder belt so that it passes relatively easily through the opening 70 in the top wall 68 of the retractor housing during operation. However, the lap belt 20 is not provided with such a guide and may be subjected to tension in various directions during use. Accordingly, to reduce drag on the lap belt 20 during operation, a guide sleeve 72 is provided extending outwardly from the front wall and having a flared mouth 74. This guides the lap belt as it is pulled into the interior of the retractor housing and wound on its associated reel 16. The sleeve 72 also functions to maintain the lap belt 20 in an easily accessible location when not in use so that the user may easily reach it to put it on after being seated in the vehicle.

Figure 4:
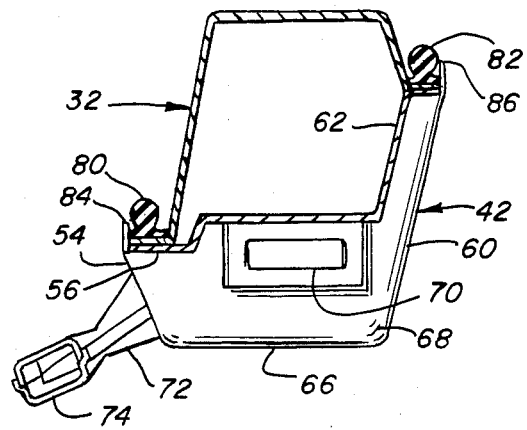
FIG. 4 is an enlarged plan view of the assembly of FIG. 1.

The support pillar 32 has vertical rubber door seals 80 and 82 (FIG. 4) which engage corners of the respective forward and rearward doors 34 and 36 when they are closed. The outer edges 84 and 86 of the front and rear walls 54 and 60 of the retractor assembly housing 42 extend to be adjacent the seals 80 and 82, as best seen in FIG. 4.

From the foregoing it will be appreciated that the present invention provides a novel safety belt retractor assembly which includes lighting means for illuminating areas adjacent the assembly. It will be understood that while preferred embodiments of the present invention are illustrated and described herein, there is no intent to limit the scope of the invention by this disclosure.

What is claimed is:

1. A combination seat belt retractor and light assembly to be mounted in a vehicle van adjacent a support pillar between forward and rearward doorways for illuminating the floor and step adjacent the doorways, the retractor assembly comprising:
    a frame,
    a pair of reels mounted rotatably on the frame,
    a lap belt and shoulder belt, each having one end attached to one of the reels,
    biasing means for each reel for imparting torsion thereto so as to rotate the respective reels and wind the respective belts therearound,
    a housing having a forward wall adjacent the forward side of the support pillar, a rearward wall adjacent the rearward side of the support pillar, a side wall extending between the forward and rearward walls, and a top wall adjacent the pillar and integrally connected to the forward, rearward, and side walls, the housing having openings to accommodate the lap belt and shoulder belt respectively, means on the housing guiding the belts into and from their respective reels,
    forward lighting means mounted on the forward wall for illuminating the vehicle interior adjacent the forward doorway, and
    rearward lighting means mounted on the rearward wall of the housing for illuminating the interior of the vehicle and the step and floor adjacent the rearward doorway.

2. A combination seat belt retractor and light assembly in accordance with claim 1 further comprising switch means operated by the doors for switching at least one of the lighting means on and off.

3. A combination seat belt retractor and light assembly in accordance with claim 2 wherein the switch means includes sensing means for determining whether the respective forward and rearward doors of the doorways doorway are open or closed.

4. In an automotive van, the combination comprising,
    a floor in the van,
    a front door for and a forward doorway in said van,
    a front seat in the van,
    a rearward doorway having a sliding door behind the front seat,
    a support pillar extending vertically in the van between said front set and said sliding door,
    a seat belt retractor means mounted on said pillar,
    a pair of reels mounted rotatably on the retractor means,
    a lap belt and shoulder belt, each having one end attached to one of the reels for positioning about a passenger in the front seat,
    a housing for the retractor means having a forward wall adjacent a forward side of the support pillar, a rearward wall adjacent a rearward side of the support pillar and extending rearwardly and outwardly of said seat belt retractor means, the housing having openings to allow travel of the lap belt and shoulder belt, respectively, into and from the housing, guide surfaces on the housing guiding the belts as they travel into and from the housing,
    forward lighting means mounted at the forward wall of the housing for illuminating the vehicle interior adjacent the forward doorway, and
    rearward lighting means at the rearward wall of the housing for illuminating the step and the floor of the vehicle adjacent the rearward doorway.

5. In an automotive van, the combination comprising:
    a floor in the van,
    a front door for and a forward doorway in said van,
    a front seat in the van,
    a rearward doorway having a step and a sliding door behind the front seat,
    a support pillar extending vertically in the van between said front seat and said sliding door,
    a seat belt retractor means mounted on said pillar,
    a shoulder belt and a lap belt reel retractor mounted rotatably on the retractor means,
    a lap belt and shoulder belt, each having one end attached to one of the reels for positioning about a passenger in the front seat,
    a housing mounted on the pillar having a forward wall adjacent a forward side of the support pillar, a rearwardly and outwardly extending wall on said housing on the retractor means adjacent a rearward side of the support pillar, a top wall on said housing having means to guide the shoulder belt for travel into and from the shoulder belt retractor, means on the forward wall of the retractor to guide the lap belt into and from the lap belt retractor,
    forward lighting means at the forward wall mounted at a location below the retractors for illuminating the vehicle interior adjacent the forward doorway, said support pillar having a center wall adjacent said retractor means and an outwardly and rearwardly extending wall extending rearwardly and outwardly of the retractors, and
    rearward lighting means mounted on said outwardly and rearwardly extending housing wall at a location rearwardly and outwardly of said retractors for illuminating the step and the floor of the vehicle adjacent the rear doorway.

* * * * *

UNITED STATES PATENT AND TRADEMARK OFFICE
CERTIFICATE OF CORRECTION

PATENT NO. : 4,823,239
DATED : April 18, 1989
INVENTOR(S) : Gerald Doty

It is certified that error appears in the above-identified patent and that said Letters Patent is hereby corrected as shown below:

Column 1, line 44, change "laps" to --lamps--.

Column 4, Line 12, after "housing." insert a new paragraph.

Column 5, Line 43, after "doorways" delete "doorway".

Column 6, Line 33, after "housing" insert --on the retractor means--.

Column 6, Line 36, after "housing" delete "on the retractor means".

Signed and Sealed this

Fifth Day of December, 1989

*Attest:*

JEFFREY M. SAMUELS

*Attesting Officer*     *Acting Commissioner of Patents and Trademarks*